United States Patent Office 3,275,549
Patented Sept. 27, 1966

3,275,549
DESICCANT REGENERATION
Clarence R. Crabb, Lake Jackson, and Leighton S. McDonald, Angleton, Tex., assignors to The Dow Chemical Company, Midland, Mich., a corporation of Delaware
No Drawing. Filed July 31, 1963, Ser. No. 299,106
4 Claims. (Cl. 210—30)

The present invention concerns an improved method for regeneration of ion exchange resins which are employed as desiccants. More specifically, the invention concerns a method for the removal of sorbed water from ion exchange resins through formation and subsequent separation from the resin of low boiling point water-halogenated hydrocarbon azeotropes.

In general, ion-exchange resin desiccants which have become water laden are regenerated by directing a flow of hot dry air, at a temperature within the range of 100°–150° C., through the resin for a period of time sufficient to remove the sorbed water. The extended time periods necessary to dry the desiccant and the amount of relatively expensive equipment required are serious disadvantages of this method.

It has now been discovered, in accordance with the method of the present invention, that certain halogenated hydrocarbons may be advantageously employed to regenerate water laden ion exchange resins. This regeneration is accomplished by contacting the water laden resins with certain halogenated hydrocarbon fluids capable of forming azeotropes with water which azeotropes have a boiling point ranging between about 50° and 165° C. The water laden ion exchange resin-halogenated hydrocarbon mixture is maintained at a temperature at or above the azeotrope boiling point and the azeotrope is distilled off. A quantity of the halogenated hydrocarbon at least sufficient to form an azeotrope with the water to be removed is employed and the distillation process is continued until the ion exchange resin is dried to the desired degree. The azeotrope distillate may be condensed and the halogenated hydrocarbon recovered for further use by separation of the essentially immiscible water and halogenated hydrocarbon layers of the condensate.

The halogenated hydrocarbon may be brought into contact with the water laden ion exchange resin either by passing heated vapors of the halogenated hydrocarbon into contact with the resin or by immersing the resin in the liquid halogenated hydrocarbon. In either case, the water present is removed by maintaining the system at or above the azeotrope boiling point to effect azeotropic distillation. When heated halogenated hydrocarbon vapors are passed into contact with the water laden ion exchange resin, the temperature necessary to effect azeotropic distillation may be achieved by allowing sufficient time for the system to become heated to a temperature at or above the azeotrope boiling point. Alternatively, the halogenated hydrocarbon-water laden resin mixture may be heated to the required azeotropic distillation temperature by external means. As an example of the latter procedure, the ion exchange resin to be dried may be contained in a column or bed which is heated with an electrical heating tape.

The halogenated hydrocarbon employed in the method of the present invention is selected to provide a halogenated hydrocarbon-water azeotrope having a boiling point between about 50°–165° C. Lower boiling azeotropes result in inefficient drying while higher boiling azeotropes can cause resin degradation. An azeotrope boiling between about 85°–125° C. is preferred. The process of the present invention is preferably carried out at atmospheric or substantially atmospheric pressure as a matter of convenience although subatmospheric pressures can be utilized.

The amount of halogenated hydrocarbon employed necessarily depends upon the amount of water in the resin to be dried, the amount of water which is desired to be removed and the type and form of the ion exchange resin. Maximum drying is accomplished when azeotropic distillation ceases as indicated by a change in the temperature at which the distillate comes off and by the absence of a water layer in the condensate.

A wide variety of halogenated hydrocarbons, capable of forming azeotropes with water which have boiling points within the 50°–165° C. range, may be utilized in the method of the present invention. Examples of these include trichloroethylene, perchloroethylene, methylchloroform, 1,1,2 - trichloroethane, 1,1,1,2 - tetrachloroethane, 1,1,2,2 - tetrachloroethane, carbon tetrachloride, ethylene dichloride, propylene dichloride, chloroform, 1,2,3-trichloropropane, and the like which form azeotropes with water having boiling points within the previously specified range. As mentioned earlier, it is possible, although not necessary, to re-use the halogenated hydrocarbon by separation of the essentially immiscible water and hydrocarbon layers of the condensate.

Any ion exchange resin which is employed as a desiccant, or in a process resulting in the sorption of water by the resin may be regenerated by the method of the present invention provided that the resin is inert towards the halogenated hydrocarbon under the drying conditions employed.

The following examples describe completely representative specific embodiments of the present invention. These examples, however, are not to be interpreted as limiting the invention other than as defined in the claims.

Example 1

A section of 0.622 inch inside diameter glass tubing was used to construct a drying column. This column was filled with 30 inches, equal to 138 grams, of Dowex 50W-X8, a dry sulfonated polystyrene resin, in the potassium salt form cross-linked with about 8 weight percent divinylbenzene, having a 20 to 50 U.S. standard mesh size. Wet methylene chloride containing 0.144 percent by weight water was passed down through this column at a rate of 5 gallons per minute per square foot. The effluent from the bottom of the column contained about 0.0002 weight percent water which is equivalent to a removal efficiency of approximately 99.8 percent. This flow was continued through the column until the water content of the effluent rose to about 0.001 weight percent at which time the flow was discontinued. The total water removed at this time was calculated to be 14.9 lbs. of water per 100 lbs. of dry resin.

A small evaporator pot was connected to the bottom of the drying column. A quantity of about 500 milliliters of perchloroethylene was added to this pot and heated therein to the boiling point with the vapors allowed to travel up through the desiccant column. These vapors heated the resin bed to a temperature sufficiently high to enable removal of the water in the form of water-perchloroethylene azeotrope vapors which were allowed to pass out through the top of the column. This process was continued for a period of four hours until the absence of a water layer in the condensate indicated cessation of azeotrope formation. The evaporator pot was then removed and the capacity of the dried resin was once more determined by passing wet methylene chloride through the column until the water in the effluent rose to 0.001 weight percent. The capacity after the perchloroethylene vapor regeneration was found to be approximately 15.6 lbs. of water removed per 100 lbs. of dry resin.

This process was repeated several times, using the same resin, with similar results as measured by comparable capacities after each regeneration.

In another experiment the resin drying column was externally wound with an electric heating tape and the column was heated gently during the regeneration cycle. This decreased the regeneration time and resulted in less pressures buildup in the evaporator with complete regeneration of the resin being accomplished in a time of one and one-half hours.

In a similar manner, other halogenated hydrocarbons including trichloroethylene and methylchloroform were employed for regeneration of water laden ion exchange resin desiccants in the method of the above example. These halogenated hydrocarbons were found to be similarly effective in removing water from the desiccant.

The sodium and hydrogen forms of the resin employed in the above example were also utilized in the procedure described above with similar results.

*Example 2*

The method of Example 1 was employed except that the wet ion exchange resin was placed in a vessel containing trichloroethylene. This vessel containing wet resin immersed in the halogenated hydrocarbon was then heated to the boiling point of the trichloroethylene azeotrope and the water-trichloroethylene azeotropic vapors conducted to a condensation column. After about one and one half hours, the resin was removed and found to be fully regenerated for re-use as a desiccant.

In summary, it is to be noted that the method of the present invention does not depend on solubility of water in the halogenated hydrocarbon. On the contrary, the method of the present invention employs a halogenated hydrocarbon which is capable of forming a low boiling point azeotrope which, upon subsequent condensation, separates into two essentially immiscible components. Thus in the method of the present invention, solubility of the components present, i.e. water and halogenated hydrocarbon, is neither necessary nor desirable.

*Example 3*

For comparison purposes, two equal weights of a water laden ion exchange resin were dried by separate methods, i.e. regeneration by passage of heated air through the resin and regeneration by the method of the present invention employing perchloroethylene. A regeneration temperature of 150° C. was employed in both cases. The resin was essentially completely dried in 1.5 hours when employing the method of the present invention as compared to a 4.5 hour period necessary to achieve the same amount of water removal when employing the conventional hot air process.

We claim:
1. A method for the removal of sorbed water from a cation-exchange resin which comprises contacting said resin with a halogenated hydrocarbon capable of forming an azeotrope with water, said azeotrope having a boiling point of from about 50° to 165° C., and maintaining said halogenated hydrocarbon-resin mixture at a temperature sufficiently high to effect distillation of said azeotrope.
2. The method of claim 1 wherein said resin is a sulfonated polystyrene resin.
3. The method of claim 1 wherein said halogenated hydrocarbon is perchloroethylene.
4. The method of claim 1 wherein said halogenated hydrocarbon is trichloroethylene.

References Cited by the Examiner
UNITED STATES PATENTS
2,827,490   3/1958   Martin _____ 202—42 X

OTHER REFERENCES

R. Kunin, "Element of Ion Exchange," page 61, article, Moisture-Holding Capacity relied upon. Copyright 1960 by Heinhold Publishing Corp.

MORRIS O. WOLK, *Primary Examiner.*

E. G. WHITBY, *Assistant Examiner.*